United States Patent Office 3,809,645
Patented May 7, 1974

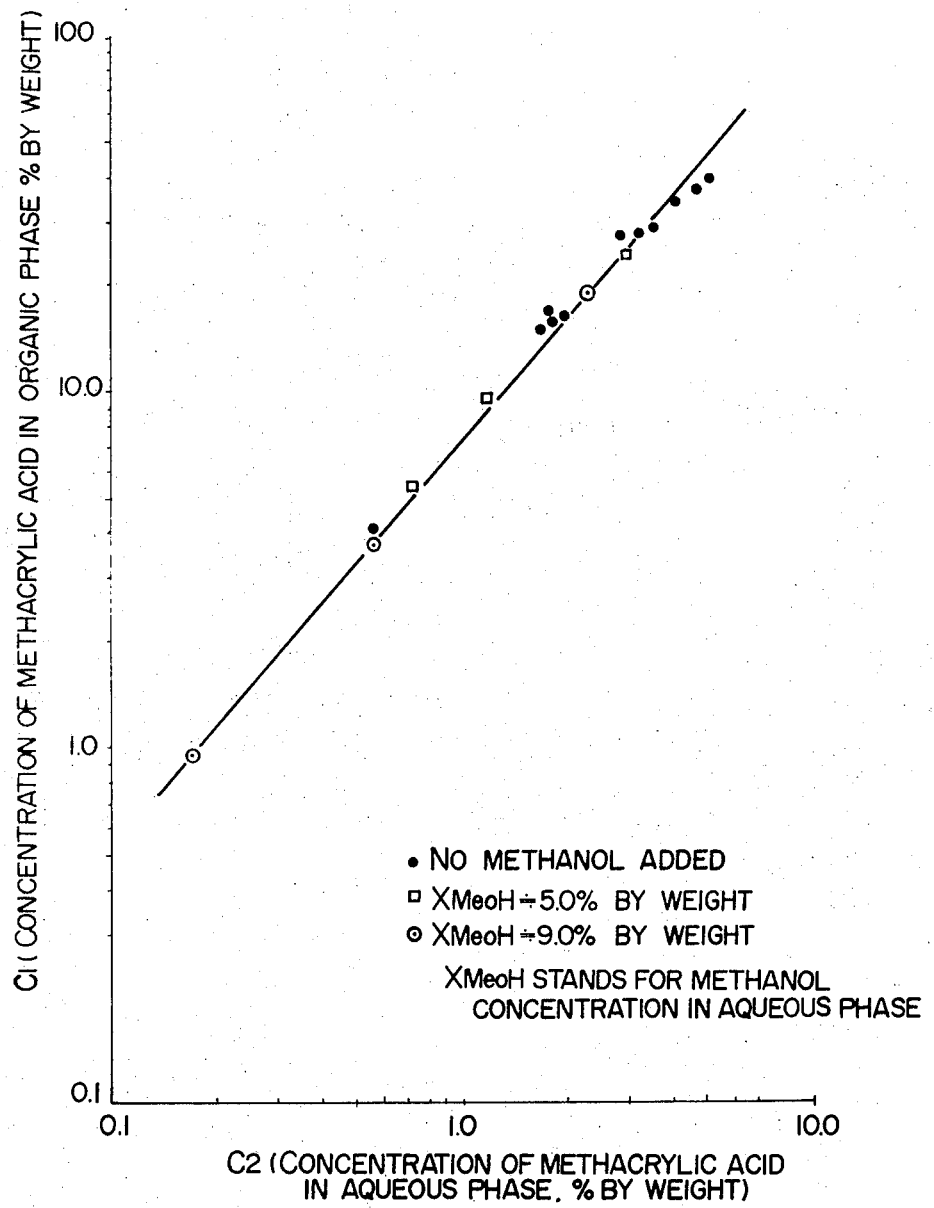
FIG. 2 DISTRIBUTION OF METHACRYLIC ACID

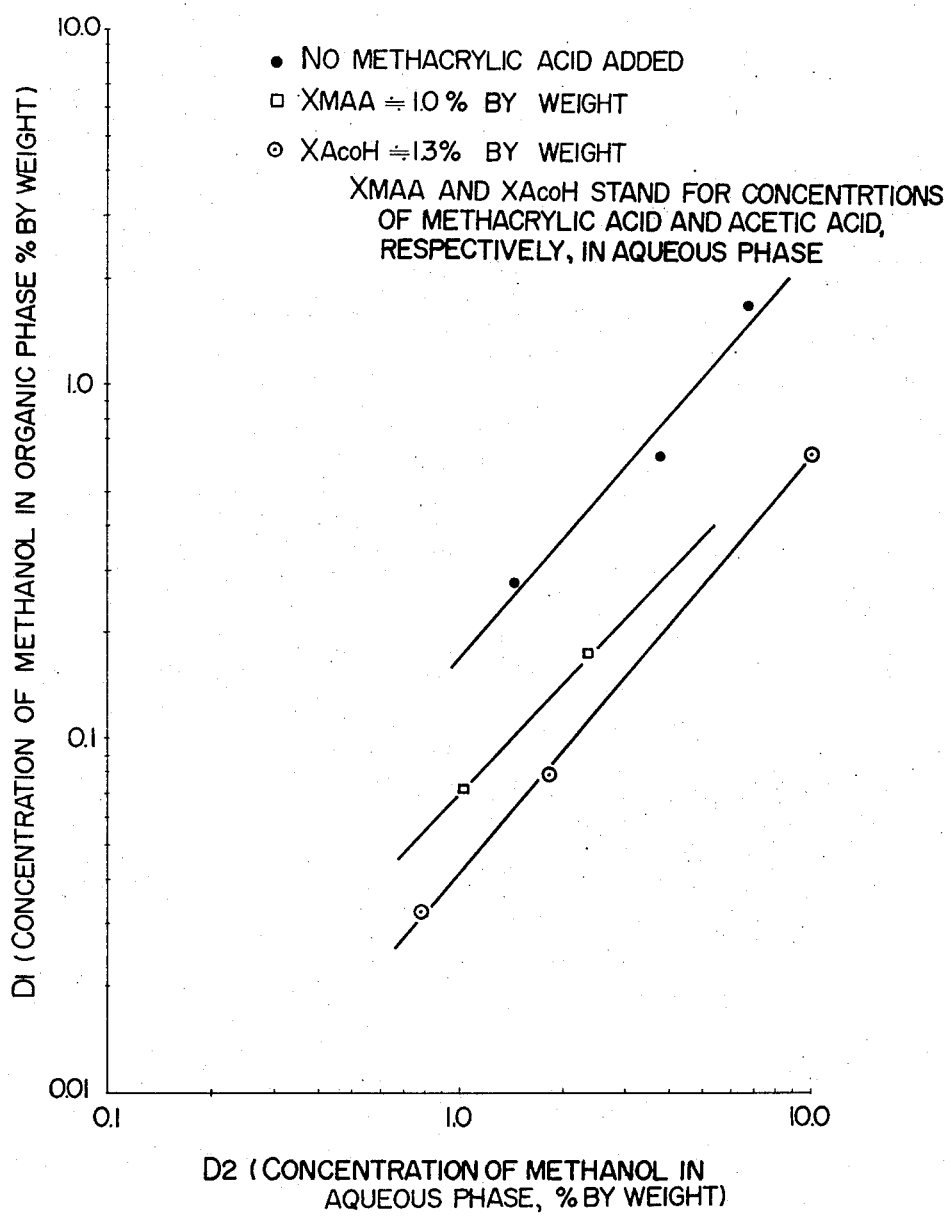

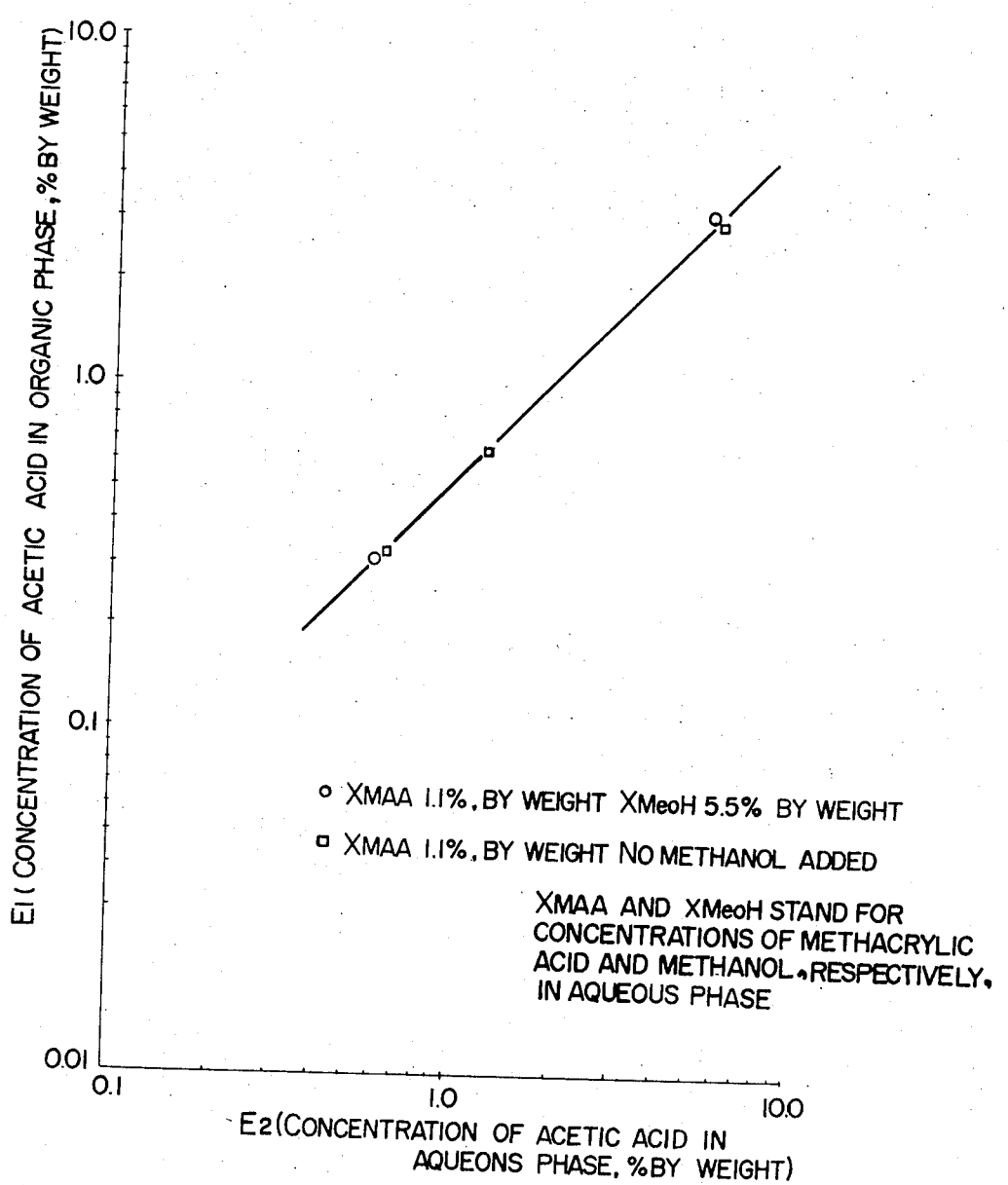
FIG. 4 DISTRIBUTION OF ACETIC ACID

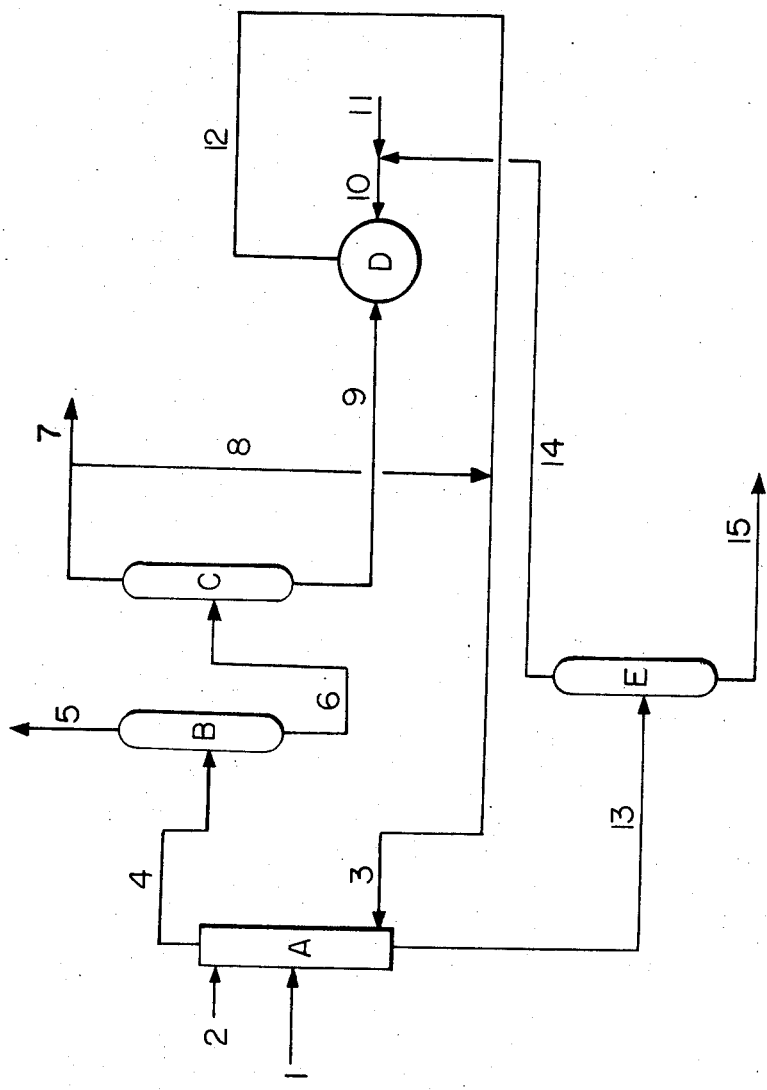
FIG. 5  ONE EMBODIMENT OF PROCESS OF THE PRESENT INVENTION

3,809,645
RECOVERING METHACRYLIC ACID AND METHANOL
Hideo Matsuzawa and Takashi Tokutomi, Ohtake, Japan, assignors to Mitsubishi Rayon Co., Ltd., Tokyo, Japan
Filed Apr. 3, 1973, Ser. No. 347,414
Int. Cl. B01d 11/04
U.S. Cl. 210—21    7 Claims

ABSTRACT OF THE DISCLOSURE

An aqueous solution (A) containing 3–50% by weight of methacrylic acid, 0.1–14% by weight of acetic acid and a small amount of impurities, if any, a liquid mixture (B) containing 40% by weight or more of methyl methacrylate, 3–40% by weight of methanol, 22% by weight or less of water and a small amount of impurities, if any, and water (C) other than the water contained in said (A) and (B) are supplied to an extractor, thereby effecting a liquid-liquid contact. A liquid mixture containing methacrylic acid and methyl methacrylate as main components and a liquid mixture containing methanol, water and acetic acid as main components are separated by the liquid-liquid contact, whereby methacrylic acid is separated from the solution (A), and methanol from the liquid (B) at the same time.

---

This invention relates to a process for separating methacrylic acid from a liquid mixture containing methacrylic acid, acetic acid and water as main components and at the same time separating methanol from a liquid mixture containing methyl methacrylate, water and methanol as main components, which is particularly useful for a process for synthesizing methyl methacrylate by oxidizing isobutylene and/or methacrolein thereby to produce methacrylic acid and further esterifying the resulting methacrylic acid with methanol.

When isobutylene and/or methacrolein is oxidized, methacrylic acid is obtained, in the most cases, in a relatively dilute aqueous solution state, containing by-produced acetic acid and a small amount of other materials. Methacrylic acid can be separated from such a relatively dilute aqueous solution by distillation, but in that case a large amount of water must be distilled off, that is, a large amount of heat is required, and it is therefore industrially disadvantageous.

It is known that a process for recovering methacrylic acid by extracting methacrylic acid from an aqueous solution into a suitable solvent, and then distilling the extract to recover methacrylic acid from the solvent is advantageous.

Many solvents, for example, ethers such as petroleum ethers, etc., unsaturated cyclic compounds such as benzene, toluene, etc., ketones such as methylethylketone, halogenated hydrocarbons such as chloroform, carbon tetrachloride, etc., esters such as isopropyl acetate, methyl methacrylate, etc., are proposed as the solvents suitable for the extraction of methacrylic acid.

However, when acetic acid as a by-product is contained in the aqueous solution at the extraction of methacrylic acid from the aqueous solution, and enters the successive esterification step together with methacrylic acid, an esterification reaction of acetic acid with methanol takes place, resulting in methanol loss. Therefore, it is necessary to separate methacrylic acid from acetic acid, when much acetic acid is contained in the aqueous solution. If such separation can be carried out at the extraction of methacrylic acid from the aqueous solution, an industrial advantage will be assured.

That is, it is industrially very advantageous that an extraction solvent only extracts methacrylic acid but fails to extract acetic acid (or extracts acetic acid to such a small degree that the extracted acetic acid gives no influence upon the successive esterification step).

On the other hand, methyl methacrylic is synthesized by esterifying the thus separated methacrylic acid with methanol. However, the resulting crude ester contains a considerable amount of unreacted methanol, water formed by the reaction, methacrylic acid and a small amount of other by-products in addition to methyl methacrylate as a main component. It is difficult to separate methanol from the crude ester by distillation because there is an azeotropic relation between methyl methacrylate and methanol (methanol: 91% by weight; boiling point: 64° C. (760 mm. Hg)).

Therefore, there is known a process for separating methanol therefrom by extracting methanol into water from the crude ester to obtain an aqueous methanol solution, and distilling the resulting aqueous methanol solution to recover methanol.

The present inventors have made detailed study on said two extracting operations, and have found such a surprising fact that said two extracting operations can be carried out in one and same extractor by using a liquid mixture of methyl methacrylate and methanol as an extraction solvent for extracting methacrylic acid from an aqueous solution containing methacrylic acid and acetic acid, using an aqueous solution containing 3–50% by weight of methacrylic acid and 0.1–14% by weight of acetic acid as an extraction solvent for extracting methanol from a mixture liquid of methyl methacrylate and methanol, and further adding water as the third extraction solvent thereto to prevent acetic acid from extraction together with methacrylic acid, and have accomplished the present invention.

An object of the present invention is to provide a process for recovering methacrylic acid and methanol at the same time.

Another object of the present invention is to provide a process for separating methacrylic acid from a solution of methacrylic acid and acetic acid by extraction and separating methanol from a solution of methyl methacrylate and methanol by extraction at the same time.

Other object of the present invention is to provide an economical process for the production of methyl methacrylate.

According to the present invention, there is provided a process for separating methacrylic acid from an aqueous solution (A) containing 3–50% by weight of methacrylic acid, 0.1–14% by weight of acetic acid and a small amount of impurities, if any, and methanol from a liquid mixture (B) containing at least 40% by weight of methyl methacrylate, 3–40% by weight of methanol, 22% by weight or less of water, and a small amount of impurities, if any, at the same time, characterized by supplying the aqueous solution (A), the liquid mixture (B) and water (C) other than those contained in said (A) and (B) to an extractor to effect a liquid-liquid contact, and separating a liquid mixture containing methacrylic acid and methyl methacrylate as main components and a liquid mixture containing methanol, water and acetic acid as main components.

According to the present invention, an aqueous solution containing methacrylic acid, acetic acid and a small amount of impurities, which is obtained by oxidation of isobutylene and/or methacrolein, and will be hereinafter referred to as "aqueous solution of methacrylic acid and acetic acid," is brought into a liquid-liquid contact with a crude ester of methyl methacrylate containing methanol, which is obtained by esterification of methacrylic acid and will be hereinafter referred to as "crude ester," as shown in examples which follows, wherein each of the solution or liquid mixture acts as an extraction solvent to each other. Further, water, which is added thereto as the third extraction solvent, acts as a separating agent for methacrylic acid and acetic acid, and can accomplish said two extracting operations, that is, separation of methacrylic acid from the aqueous solution, separation of methanol from the crude ester, as well as separation of methacrylic acid from acetic acid, at the same time. Therefore, the great part of the process for producing methyl methacrylate can be saved.

Heretofore, water has been used in extracting methanol for the liquid mixture of methyl methacrylate and methanol, but the present invention has been accomplished on the basis of an unexpected fact that separation of methanol by extraction becomes considerably easier and more complete when an aqueous solution containing a specific amount of methacrylic acid and acetic acid is used as the extraction solvent, and therefore its industrial effect is remarkable.

Now, the present invention will be explained in detail by way of the accompanying drawings:

FIGS. 2, 3 and 4 are diagrams showing distributions of methacrylic acid, methanol and acetic acid, respectively, in their liquid-liquid equilibrium relations.

FIG. 5 is a schematic flow sheet showing one embodiment of processes for synthesizing methyl methacrylate according to the present invention.

Figure 1:
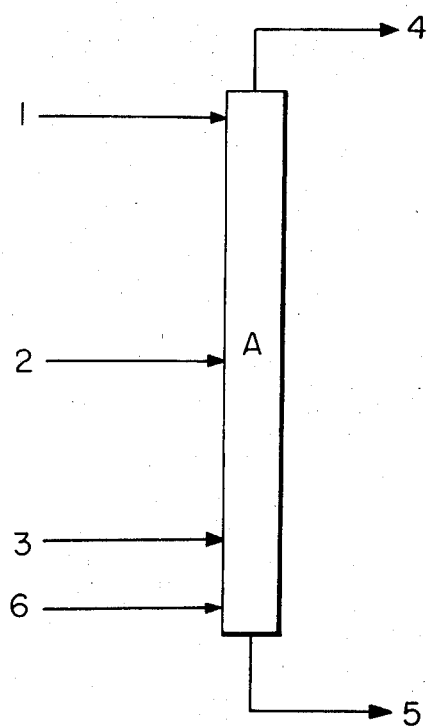
FIG. 1 is a schematic view showing an extracting operation of the present invention.

In FIG. 1, a symbol "A" shows the ordinary apparatus for extraction, which is operated in the temperature range of normal to 70° C. Water is supplied through a pipe 1. An aqueous solution of methacrylic acid and acetic acid is supplied through a pipe 2. The composition of the aqueous solution is 3–50% by weight of methacrylic acid, 0.1–14% by weight of acetic acid, and a small amount of other impurities, such as acetaldehyde, propionaldehyde, acetone, methacrolein, etc., the remainder being water. A liquid mixture of methyl methacrylate and methanol is supplied through a pipe 3. The composition of the liquid mixture is at least 40% by weight of methyl methacrylate, 3–40% by weight of methanol, 22% by weight or less of water, and a small amount of methacrylic acid and other impurities, if any.

The liquid mixture referred to herein is a reaction product obtained by esterifying methacrylic acid with methanol in a usual manner, that is, a crude ester. A small amount of unreacted methacrylic acid, by-products, etc. are contained in the crude ester, but they give no influence upon the practice of the present invention at all.

When the concentration of methyl methacrylate contained in the crude ester is less than 40%, it is necessary to make it up to an appropriate one by adding methyl methacrylate thereto from other source.

Even if the concentration of methyl methacrylate in the crude ester is 40% or more, fresh methyl methacrylate can be added thereto, if required.

When the fresh methyl methacrylate is added to the crude ester, it is not always necessary to add methyl methacrylate to the crude ester before supplying the crude ester to the extractor, but the fresh methyl methacrylate can be supplied directly to the extractor through another inlet nozzle close to the one for the crude ester.

In FIG. 1, the crude ester is supplied through the pipe 3, and the additional methyl methacrylate is supplied through a pipe 6, if required. On the contrary, the crude ester can be supplied through the pipe 6 and methyl methacrylate can be supplied through the pipe 3.

However, in order to recover completely a small amount of unreacted methacrylic acid contained in the crude ester, it is usually preferable to supply the additional methyl methacrylate through the inlet nozzle below the one for the crude ester. The ratio of the liquid mixture of methyl methacrylate and methanol to the aqueous solution of methacrylic acid to be supplied to the extractor is preferably in the range of 0.2 to 3.0 by weight, but when the amount of the crude ester is not sufficient, methyl methacrylate can be additionally supplied to the extractor column in the same manner as described above. In that case, it is preferable that sum total of the crude ester and the additionally supplied methyl methacrylate may be in said range of ratio of 0.2 to 3.0 by weight. It is preferable that the ratio of water supplied through the pipe 1 of FIG. 1 to the aqueous solution of methacrylic acid is in the range of 0.1 to 3.0 by weight. An organic phase containing methacrylic acid and methyl methacrylate as main components can be obtained through a pipe 4, and an aqueous phase containing methanol, water and acetic acid as main components can be obtained through a pipe 5.

Now, liquid-liquid equilibrium relations serving as basic data for the present invention will be explained.

In FIG. 2, states of distribution of methacrylic acid in liquid-liquid equilibrium of a methacrylic acid-water-methyl methacrylate system, and the influence of admixture of methanol on that state of distribution are given, where $C_1$ shows percent by weight of methacrylic acid in the organic phase, and $C_2$ shows percent by weight of methacrylic acid in the aqueous phase.

When a material containing both hydrophilic and hydrophobic groups, such as methanol is admixed in that system, it may be expected that the distribution coefficient $K$ ($K=C_1/C_2$) of methacrylic acid will decrease, but as shown in FIG. 2, it is found, unexpectedly, that no decrease in K takes place at all by methanol admixture.

It is found from the foregoing fact that the crude ester containing methanol has quite the same efficiency as pure methylmethacrylate for extracting methacrylic acid.

FIG. 3 shows the state of distribution of methanol in the liquid-liquid equilibrium of methanol-methyl methacrylate-water system and an influence of admixture of methacrylic acid or acetic acid upon that state of distribution. As is apparent from FIG. 3, methanol can be more easily extracted from a liquid mixture of methyl methacrylate and methanol, unexpectedly, with water containing methacrylic acid and acetic acid, than with pure water.

FIG. 4 shows the state of distribution of acetic acid when methacrylic acid is admixed into a system of acetic acid-methyl methacrylate-water and influence of further admixture of methanol upon that state of distribution. As is apparent from FIG. 4, there is no difference in the state of distribution of acetic acid between the case of admixture of methanol to the system and the case of non-admixture thereof.

The foregoing results have been obtained by the present inventors through experiments, and they were quite unexpected facts prior to the experiment.

Now, an illustrative embodiment of rationalization of a process for synthesizing methyl methacrylate according to the present invention will be explained.

In FIG. 5, an aqueous solution of methacrylic acid and acetic acid as mentioned above is supplied to an extractor column A through a pipe 1, water thereto through a pipe 2 and a crude ester thereto through a pipe 3. An organic phase discharged through a pipe 4 is led to a distillation column B, and low boiling point components are discharged through a pipe 5.

At that time, a portion of methyl methacrylate is distilled off together with the low boiling point components due to an azeotropic distillation with a small amount of water contained therein, but methyl methacrylate loss can be prevented by subjecting the distillate to two-phase decantation to remove water therefrom, and returning the methyl methacrylate phase to the column.

The liquid made free from the low boiling point components is supplied to a distillation column C through a pipe 6, and methyl methacrylate is distilled off through a pipe 7 as a product.

A liquid containing methacrylic acid as a main component is discharged from the bottom of the distillation column C, and led to an esterification reactor D through a pipe 9. Methanol is also supplied to the esterification reactor D through a pipe 10, and the esterification reaction is carried out in the ordinary manner. Crude ester formed in the esterification reactor D is withdrawn therefrom through the pipe 12, and supplied to the bottom of the extraction column A through the pipe 3 after admixed with suitable amount of methyl methacrylate through the pipe 8, if required. At that time, it is not always necessary to add methyl methacrylate to the crude ester prior to the supply of the crude ester to the extraction column A, but methyl methacrylate can be supplied to the extraction column A directly through another inlet nozzle than the pipe 3 at the bottom of the extraction column A, as mentioned above.

On the other hand, an aqueous phase discharged from the bottom of the extraction column A is led to a distillation column E through a pipe 13.

In the distillation column E, methanol is separated from its aqueous solution. The distilled methanol is withdrawn therefrom through the pipe 14 and supplied to the esterification reactor D through the pipe 10 together with fresh methanol supplied through the pipe 11.

The process as described above is considerably reduced in unit process steps and has great industrial advantages, as compared with the prior art process. That is, as explained above, extraction of methacrylic acid from an aqueous solution of methacrylic acid and acetic acid, and extraction of methanol from a crude ester are carried out in one and same extraction column, and thus a single extraction column can meet this purpose. Further, the step of solvent-recovery from the organic phase discharged from the extraction column (separation from methacrylic acid) and the step of purifying methyl methacrylic from the crude ester can be carried out commonly, resulting in omission of several distillation columns.

Now, the present invention will be explained by way of examples.

EXAMPLE 1

A glass pipe having an inside diameter of 31 mm. was partitioned into 36 stages by inserting suitable partition plates into the glass pipe, and rotating vanes were provided at each stage and were capable of rotating at 360–600 r.p.m. with a common shaft. The thus prepared glass pipe was used as an extraction column.

An aqueous solution of methacrylic acid and acetic was supplied to a middle section of the column, water to the upper section of the column, and crude ester to the lower section of the column to effect mutual contact of the liquids. An organic phase was obtained from the top of the column, and an aqueous phase from the bottom of the column.

At that time, the percentage by weight of methacrylic acid contained in the organic phase to the methacrylic acid supplied to the extraction column was designated as $F_1$, the percentage by weight of methanol contained in the aqueous phase to the methanol supplied as $F_2$, and the percentage by weight of acetic acid contained in the aqueous phase to the acetic acid supplied as $F_3$.

The following results were obtained from the foregoing experiment. When water was supplied at a rate of 400 g./hr., a liquid mixture containing 17.8% by weight of methacrylic acid, 1.34% by weight of acetic acid, and 80.9% by weight of water as the aqueous solution of methacrylic acid and acetic acid at the rate of 392 g./hr., and a liquid mixture containing 7.1% by weight of water, 83.0% by weight of methyl methacrylate, and 9.9% by weight of methanol as the crude ester at a rate of 400 g./hr., the organic phase and the aqueous phase having the following compositions were obtained at the following rates.

|  | Organic phase | Aqueous phase |
| --- | --- | --- |
| Composition (percent by weight): |  |  |
| Methacrylic acid | 16.4 | 0.069 |
| Acetic acid | 0.070 | 0.66 |
| Water | 4.67 | 92.7 |
| Methyl methacrylate | 78.9 | 1.50 |
| Methanol | Trace | 5.24 |
| Discharge rate (g./hr.) | 425 | 753 |

At that time, $F_1=99.3\%$, $F_2=100\%$ and $F_3=94.4\%$.

EXAMPLE 2

Extraction was carried out in the same apparatus as in Example 1. When water was supplied thereto at a rate of 588 g./hr., a liquid mixture containing 18.9% by weight of methacrylic acid, 1.36% by weight of acetic acid and 79.7% by weight of water as the aqueous solution of methacrylic acid and acetic acid at a rate of 400 g./hr., and the liquid mixture of the same composition as in Example 1 as the crude ester at the rate of 600 g./hr., the organic phase and the aqueous phase of the following compositions were obtained at the following rates.

|  | Organic phase | Aqueous phase |
| --- | --- | --- |
| Composition (percent by weight): |  |  |
| Methacrylic acid | 12.9 | 0.04 |
| Acetic acid | 0.018 | 0.54 |
| Water | 3.72 | 92.1 |
| Methyl methacrylate | 83.5 | 1.55 |
| Methanol | Trace | 6.00 |
| Discharge rate (g./hr.) | 592 | 988 |

At that time, $F_1=99.5\%$, $F_2=100\%$, and $F_3=98.0\%$.

EXAMPLE 3

Extraction was carried out in the same apparatus as in Example 1. When water was supplied thereto at a rate of 309 g./hr., a liquid mixture containing 10.1% by weight of methacrylic acid, 1.0% by weight of acetic acid and 89.0% by weight of water as the aqueous solution of methacrylic acid and acetic acid at the rate of 630 g./hr., and a liquid mixture containing 5.0% by weight of water, 84.9% by weight of methyl methacrylate and 10.1% by weight of methanol as the crude ester at a rate of 365 g./hr., the organic phase and aqueous phase having the following compositions were obtained at the following rates.

|  | Organic phase | Aqueous phase |
| --- | --- | --- |
| Composition (percent by weight): |  |  |
| Methacrylic acid | 16.6 | 0.061 |
| Acetic acid | 0.072 | 0.659 |
| Water | 5.44 | 94.4 |
| Methyl methacrylate | 77.9 | 1.30 |
| Methanol | Trace | 4.02 |
| Discharge rate (g./hr.) | 383 | 916 |

At that time, $F_1=99.1\%$, $F_2=100\%$ and $F_3=95.6\%$.

What is claimed is:

1. A process for simultaneously separating methacrylic acid from an aqueous solution (A) containing 3–50% by weight of methacrylic acid and 0.1–14% by weight of acetic acid, and methanol from a mixture solution (B) containing 40% by weight or more of methyl methacrylate, 3–40% by weight of methanol and 22% by weight or less of water, which comprises supplying the aqueous solution (A), the liquid mixture (B) and another water (C) than those contained in said (A) and (B) to an extractor from the respective supply inlets, thereby effecting liquid-liquid contact with one another and separating the liquid into a liquid mixture comprising methacrylic acid and methyl methacrylate, and a liquid mixture comprising methanol, water and acetic acid.

2. A process according to claim 1, wherein an aqueous solution containing methacrylic acid, acetic acid and a small amount of impurities, obtained by oxidation of at least one of isobutylene and methacrolein, is used as the aqueous solution (A).

3. A process according to claim 1, wherein a crude ester obtained by esterifying methacrylic acid with methanol is used as the liquid mixture (B).

4. A process according to claim 3, wherein the crude ester to which fresh methyl methacrylate is added is supplied to the extractor as the liquid mixture (B).

5. A process according to claim 4, wherein the crude ester and methyl methacrylate are added to the extractor through separate inlets, respectively.

6. A process according to claim 1, wherein ratio by weight of the liquid mixture (B) to the aqueous solution (A) is 0.2 to 3.0.

7. A process according to claim 1, wherein the ratio by weight of the water (C) to the aqueous solution (A) is 0.1 to 3.0.

References Cited
UNITED STATES PATENTS

| | | | |
|---|---|---|---|
| 3,414,485 | 12/1968 | Speed | 203—43 |
| 3,092,667 | 6/1963 | Murphy | 260—643 D |
| 2,872,478 | 2/1959 | Wechsler | 260—643 D |

FRANK A. SPEAR, JR., Primary Examiner

F. H. LANDER, Assistant Examiner

U.S. Cl. X.R.

260—530, 533